United States Patent
Meskers, Jr. et al.

(10) Patent No.: US 8,728,324 B2
(45) Date of Patent: May 20, 2014

(54) METHOD OF CONTROLLING SCALE IN STEAM GENERATING SYSTEMS

(75) Inventors: Donald A. Meskers, Jr., Trevose, PA (US); Trevor James Dale, Trevose, PA (US); Bernard Joseph Neidert, Trevose, PA (US); Rosa Crovetto, Wayne, PA (US); Karen Annette Welton, Trevose, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/531,871

(22) Filed: Jun. 25, 2012

(65) Prior Publication Data

US 2013/0341282 A1     Dec. 26, 2013

(51) Int. Cl.
*C02F 1/00* (2006.01)
*B03D 3/06* (2006.01)
*C02F 5/02* (2006.01)
*C02F 5/08* (2006.01)
*C02F 5/10* (2006.01)

(52) U.S. Cl.
USPC ........... 210/701; 210/698; 210/696; 252/175; 252/180

(58) Field of Classification Search
None
See application file for complete search history.

(56) References Cited

U.S. PATENT DOCUMENTS

| | | | |
|---|---|---|---|
| 4,457,847 A | 7/1984 | Lorenc et al. | |
| 4,872,995 A | 10/1989 | Chen et al. | |
| 4,944,885 A | 7/1990 | Chen | |
| 4,952,324 A | 8/1990 | McDonald et al. | |
| 5,141,716 A | 8/1992 | Muccitelli et al. | |
| 5,180,498 A | 1/1993 | Chen et al. | |
| 5,271,847 A * | 12/1993 | Chen et al. | 210/697 |
| 6,444,747 B1 | 9/2002 | Chen et al. | |
| 6,641,754 B2 * | 11/2003 | Buentello et al. | 252/180 |
| 7,094,852 B2 | 8/2006 | Solov et al. | |
| 2005/0056589 A1 | 3/2005 | Hendel et al. | |

FOREIGN PATENT DOCUMENTS

EP     0 257 876 A2     3/1988
WO    WO 98/03051 A2   1/1998

OTHER PUBLICATIONS

Wikipedia, "Sulfonic Acid", 5 pages, http://en.wikipedia.org/wiki/Sulfonic_acid, Jun. 11, 2012.
Wikipedia, "Sulfonate", 2 pages, http://en.wikipedia.org/wiki/Sulfonate, Jun. 11, 2012.
International Search Report and Written Opinion mailed Sep. 24, 2013 for PCT/US2013/042960 filed May 29, 2013.

* cited by examiner

*Primary Examiner* — Nam Nguyen
*Assistant Examiner* — Clare Perrin
(74) *Attorney, Agent, or Firm* — Wegman, Hessler & Vanderburg

(57) ABSTRACT

Water soluble or water dispersible terpolymers are employed in high pressure steam generating systems to control deposit formation and contaminant transport in the aqueous medium in such systems. The terpolymer may comprise repeat units formed from acrylic acid, allylalkoxylated ethers, and allyl-hydroxylated alkyl ether.

17 Claims, No Drawings

METHOD OF CONTROLLING SCALE IN STEAM GENERATING SYSTEMS

FIELD OF INVENTION

The present invention pertains to the treatment of high pressure steam generation systems with a terpolymer comprising repeat unit moieties of allyl alkoxylated ethers. The treatment inhibits the formation of deposits that would otherwise occur along structural parts in contact with the aqueous medium in the steam generating system and improves the transport or maintenance of troublesome species, such as iron and magnesium, in dispersion in the aqueous medium.

BACKGROUND OF THE INVENTION

The deposition of solids onto heat transfer surfaces of steam generating equipment, such as industrial boiler equipment, is a major problem. Common contaminants in boiler feedwater that can form deposits are calcium and magnesium salts (hardness), carbonate salts, sulfate, phosphate, siliceous matter, and iron oxides. Any foreign matter introduced into the boiler in soluble or particulate form will tend to form deposits within the boiler and to a great extent on the heat transfer surfaces. Formation of deposits on the heat transfer surfaces will decrease the efficiency under which the heat transfer takes place, and can lead to overheating, circulation restrictions, damage to the systems, loss of effectiveness, and increased costs due to cleaning, unscheduled outages, and replacement of equipment. In an extreme case, catastrophic tube failure can occur.

Polymeric deposit control agents are frequently added to the feedwaters of boilers. Their ultimate objective is to inhibit the formation of deposits on the heat transfer surfaces and to facilitate the removal of any deposits in the blowdown and prevent deposition within the boiler system. This is accomplished via two mechanisms: a solubilization mechanism, where chelants, or chelant-type molecules, form soluble complexes with the deposit forming species which are removed in the blowdown; and an adsorption mechanism where the deposit control agent is adsorbed on the surface of the particulate matter and inhibits the formation and crystal growth of the depositing species, and disperses the deposit that is being formed, and makes it more readily removable.

At the high operating pressures and temperatures of steam generating systems, polymeric dispersants must not only contain effective chemistry to inhibit deposit formation but also must demonstrate sufficient thermal stability to remain effective. Under steam generating conditions, all polymeric materials experience some degree of thermal degradation that is dependent on structure, pressure/temperature, medium composition, and residence time within the boiler. Many polymeric materials typically employed in these applications remain stable and effective at pressures up to 300 psig but can begin to experience severe degradation as pressures are increased further, e.g., to 300 psig and above. Further, at the high temperatures and pressures in such systems, this decrease in efficacy can necessitate increased polymer feed levels and high system treatment costs. The thermal degradation in some cases can result in increased heat transfer deposition and organic fouling. Therefore, there exists a need for polymeric dispersants that are thermally stable and efficacious at pressures ranging up to and above 900 psig.

SUMMARY OF THE INVENTION

In one exemplary embodiment, a method is provided for controlling the deposit formation along the structural parts of a steam generating system that is exposed to an aqueous medium under steam generating conditions. Further, in accordance with this exemplary embodiment, the steam generating system is operated under a pressure of greater than 300 psig. In this exemplary method, a terpolymer having the following structure I is added to the aqueous medium in an effective amount:

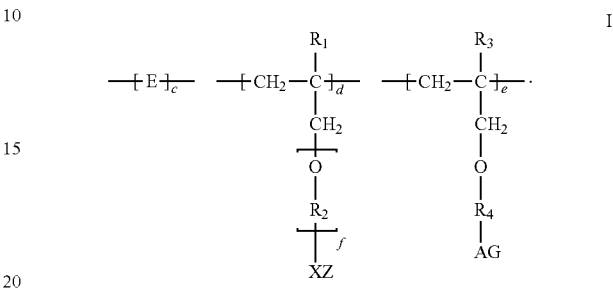

wherein E is the repeat unit remaining after polymerization of an ethylenically unsaturated compound, $R_1$ is H or $C_1$-$C_4$ alkyl; $R_2$ is ethylene, isopropylene, or propylene; f is an integer of 1-100; X and A are independently selected from anionic groups of $OSO_3$, $SO_3$, $PO_3$, $OPO_3$, or COO; G and Z are independently selected from H or a cation including Na, K, or $NH_4$; $R_3$ is H or $C_1$-$C_4$ alkyl, and $R_4$ is a hydroxyl substituted alkylene radical having from 1 to about 6 carbon atoms, c, d, and e are each a positive integer.

Further, in another exemplary embodiment, moiety E of the terpolymer is acrylic acid or salt thereof with $R_1$ in the Formula I being H, $R_2$ being —($-CH_2-CH_2-$)—, X is $OSO^-_3$ and Z is Na, $NH_4$ or H; $R_3$ is H, $R_4$ is 2-hydroxypropyl; A is $SO_3$ and G is H or Na.

Further, the terpolymers in accordance with the invention may be added to the aqueous medium of the steam generating system in an amount of about 0.1-500 ppm, preferably about 2-100 ppm, and most preferably about 10-50 ppm based upon one million parts of the water in the steam generating system.

In another exemplary embodiment, the steam generating system is operated at a pressure of about 900 psig or greater, and the deposit formation may, in another embodiment, result from the presence of deposit forming species such as Ca, Mg, Fe, and silica that are present in the system water.

Further, in accordance with another aspect of the invention, the percent transport of iron in the steam generating system is improved.

The water soluble or water dispersible terpolymer treatment of the invention may, in specific embodiments thereof, comprise a terpolymer of i) acrylic acid or water soluble salt thereof; ii) allylalkoxylated ether or water soluble salt thereof; and iii) allylhydroxylated alkyl ether or water soluble salt thereof. In specific embodiments of the invention, the allylalkoxylated ether may comprise allylethoxy (10) sulfate, and the allylhydroxylated alkyl ether may comprise allyl-2-hydroxypropyl sulfonate ether.

In some instances, the aqueous medium will comprise Fe, and the method is effective to maintain the Fe and particulate oxides of Fe in dispersed form in the aqueous medium during steam generation.

DETAILED DESCRIPTION

One embodiment of the invention pertains to methods for controlling deposit formation and improving contaminant transport in steam generating systems such as boilers operating at high pressures. "High pressure" as used herein denotes these steam generation systems operating at pressures in excess of 300 psig. Specific embodiments are directed toward such methods wherein the operating pressure in the steam generating system is 900 psig or greater. "Contaminant transport" refers to maintenance of troublesome fouling species such as Fe, Ca, Mg, etc., in dispersion in the boiler system water. This characteristic is measured by calculating cycles of concentration of the boiler and multiplying the cycles by the amount of such species in the boiler feedwater to determine the theoretical contaminant loading of the system. This actual level of the contaminant in the blowdown is then divided by the theoretical contaminant loading. The resulting figure then represents the percent transport or the amount of contaminant suspended or dispersed in the boiler water.

In one exemplary embodiment, deposit formation and contaminant transport are controlled by addition of a terpolymer treatment to the boiler water. The treatment may be added to the feedwater deaerator, condensate return, steam drum, or other sections of the boiler. In one exemplary embodiment, the treatment is added in an amount of about 0.1 to 500 ppm, with an addition of from about 2 to 100 being even more preferred. In another exemplary embodiment, the treatment is added in an amount of about 10-50 ppm based upon one million parts of water in the boiler system.

As is used herein, "terpolymer" shall mean a water soluble or water dispersible polymer having at least three different repeat units therein. Each of the repeat units is defined as a polymeric repeating unit found in the polymer and formed from polymerization of a given monomer. In one embodiment, one of the repeat units of the terpolymer must be formed via polymerization of an allyl alkoxylated ether such as allylpolyethoxylated ether or allylpolypropoxylated ether. In one embodiment, the allylalkoxylated ether is allylethoxy (10) sulfate.

Generally, the terpolymer treatment to be added to the water of the high pressure steam generating system is a terpolymer represented by the structure:

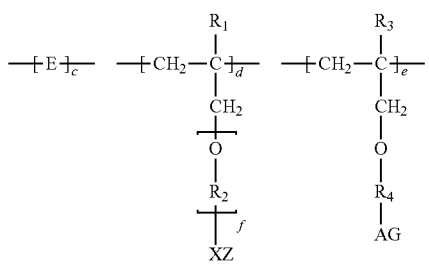

I wherein E is the repeat unit remaining after polymerization of an ethylenically unsaturated compound, preferably a carboxylic acid, sulfonic acid, phosphonic acid, or amide form thereof or mixtures thereof; $R_1$ is H or lower alkyl ($C_1$-$C_4$);

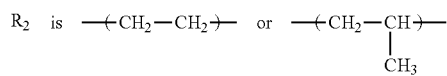

or —(—$CH_2$—$CH_2$—$CH_2$—)—; f is an integer of about 1-100, preferably from about 1-20, X and A are independently selected and are an anionic group selected from $OSO_3$, $SO_3$, $PO_3$, $OPO_3$, or COO; G and Z are independently selected and are chosen from H or a cationic group such as Na, K, or $NH_4$; $R_3$ is H or lower alkyl ($C_1$-$C_4$), and $R_4$ is a hydroxyl substituted alkylene radical having from 1 to about 6 carbon atoms.

Subscripts c, d, and e represent the molar amounts of the monomer repeat units in the terpolymer. These subscripts are each positive integers. In one exemplary embodiment, c is from about 1-80; d is about 1-30; and e is about 1-30; wherein c+d+e=100.

The molecular weight of the terpolymer treatments is not critical but preferably in one embodiment, falls within the range of about Mw 1,000-1,000,000.

In one embodiment of the invention, the high pressure steam generation system treatment terpolymer comprises E=acrylic acid (i.e., repeat units), sodium salt; allylethoxy (10) sulfate as the repeat unit d and allylhydroxypropylsulfonate ether as the repeat unit e.

Based upon presently available data, the terpolymer treatment has proven effective in reducing the amount of deposits that may otherwise be formed in high pressure steam generating systems from scale imparting species such as Mg, Ca, and silica. Additionally, iron transport is improved in such systems.

Although not intending to be bound by theory, the inventors believe that the unique performance of the novel terpolymer treatment is due the increased thermal stability offered by the inventive combination of three monomer chemistries within the disclosed ratios. Co-polymers composed of combinations of two of the monomers used in the novel terpolymer resulted in good performance at pressures up to 300 psig. The performance differential that exists at pressures above 300 was unexpected and is best explained as a result of improved thermal stability afforded by the terpolymer composition.

The terpolymer treatment in one exemplary embodiment is an acrylic acid/ammonium or sodium allylpolyethyoxy (10) sulfate/allyloxy-2-hydroxypropane sulfonic acid terpolymer that may be made in accord with the method set forth in Example 3 of U.S. Pat. No. 6,641,754. The disclosure of this patent is incorporated by reference herein. In accordance with this example, deionized water, allyloxy-2-hydroxypropane-3-sulfonic acid and ammonium allyl polyethoxy-(10)-sulfate monomer are charged to a reaction flask. The solution is heated to 85° C. while being sparged with $N_2$. An initiator of 2,2'-azobis(2-amidino propane) hydrochloride is used, and the initiator and acrylic acid are added to the reaction flask over a 3.5 hour period. The solution is then heated to 95° C. and maintained at that temperature for two hours. The reaction medium is then cooled and caustic added.

EXAMPLES

Deposit control and iron transport efficacy were evaluated in model research boilers. The research boilers are D-shaped in design and can operate at pressures ranging from 75 psig to 1500 psig. Each unit is heated via the use of electrical probes with heat flux that can be altered to simulate real world system design. System volume is approximately five liters, and the units operate with intermittent blowdown.

The units are fed by a pair of make-up tanks into which the base water chemistry and test treatment are added. Each boiler test is five days in length, and systems are continuously monitored for pH, conductivity, temperature, as well as standard wet chemical analytical methods.

At the conclusion of each test, the boiler probes are removed, and the deposit formed on the heat transfer surface is measured and analyzed. The total deposit weight (DWD) is determined and reported in $g/m^2$.

Additional performance measures are used to evaluate treatment efficacy including percent containment transport. The percent transport is calculated via the following equation:

% transport=ppm contaminant in blowdown/((ppm contaminant in feedwater)×(cycles of concentration))

Results are shown in Tables I-III.

TABLE I

| Feedwater: |
| --- |
| 4 ppm Ca as CaCO3; |
| 1 ppm Mg as CaCO3; |
| 1 ppm Fe as Fe; |
| 0.5 ppm SiO2 as SiO2 |
| 900 psig |
| 15 cycles |
| Polymer Dosage - 12.6 ppm |

| Treatment | Average DWD g/ft$^2$ | Fe Transport |
| --- | --- | --- |
| Blank | 1.778 | 1% |
| C-1 | 11.845 | 1% |
| C-2 | 0.602 | 13% |
| C-3 | 1.181 | 48% |
| Ex 1 | 0.182 | 54% |

TABLE II

| Feedwater |
| --- |
| 4 ppm Ca as CaCO3; |
| 1 ppm Mg as CaCO3; |
| 3 ppm Fe as Fe; |
| 1 pm SiO2 as SiO2 |
| 900 psig |
| 15 cycles |
| Polymer dosage - 16.8 ppm |

| Treatment | Average DWD g/ft$^2$ | Fe Transport |
| --- | --- | --- |
| Blank | 4.093 | 0% |
| C-1 | 11.513 | 4% |
| C-2 | 0.847 | 26% |
| C-3 | 1.114 | 20% |
| Ex 1 | 0.130 | 49% |

TABLE III

| Feedwater |
| --- |
| 4 ppm Ca as CaCO3 |
| 1 ppm Mg as CaCO3 |
| 1 ppm Fe as Fe |
| 6 ppm as SiO2 as SiO2 |
| 600 psig |
| 15 cycles |
| Polymer Dosage - 12.8 ppm |

| Treatment | Average DWD g/ft$^2$ | FeTransport |
| --- | --- | --- |
| Blank | 5.5963 | 1% |
| C-1 | 0.385 | 30% |
| C-2 | 0.22025 | 35% |
| C-3 | 0.484 | 78% |
| Ex 1 | 0.170833 | 89% |

Abbreviations - Tables I-III
C-1 = AA/AHPSE; acrylic acid/allylhydroxypropyl sulfonate ether.
C-2 = PMA - polymethacrylate.
C-3 = AA/APES - acrylic acid/allylpolyethoxy (10) sulfate
Ex 1 = AA/APES/AHPSE; acrylic acid/allylpolyethoxy (10) sulfate/allylhydroxypropyl sulfonate ether.

The treatment of the present invention demonstrates improved deposit control and increased contaminant transport at lower dosages when compared to certain conventional treatments. The treatment also demonstrates improved thermal stability when compared to copolymers containing the APES/AA monomers.

Not only is deposit control efficacy improved, but the inventive treatment also demonstrates improved iron and magnesium transport (under some conditions) when compared to conventional technologies.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

The invention claimed is:

1. A method of controlling deposit formation on the structural parts of a steam generating system exposed to an aqueous medium under steam generating conditions, said steam generating system operating under a pressure of 600 psig and greater, said method comprising adding to said aqueous medium an effective amount of a terpolymer having the structure

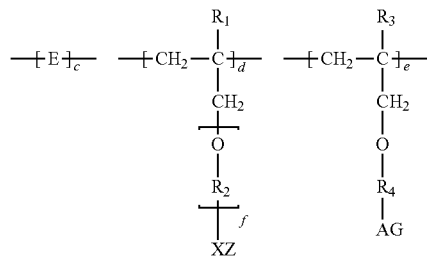

wherein E is the repeat unit remaining after polymerization of an ethylenically unsaturated with compound; $R_1$ is H or $C_1$-$C_4$ alkyl; $R_2$ is ethylene, isopropylene, or propylene; f is an integer of 1-100; A is $OSO_3$ or $SO_3$; G is selected from H or a cation including Na, K, or $NH_4$; $R_3$ is H or $C_1$-$C_4$ with alkyl; and $R_4$ is a hydroxyl substituted alkylene radical having from 1 to about 6 carbon atoms; c, d, and e are each a positive integer, and wherein X is $OSO_3$ or $SO_3$ and Z is Na, K, $NH_4$ or H.

2. A method as recited in claim 1 wherein E is acrylic acid or salt thereof, $R_1$ is H, and $R_2$ is —(—$CH_2$—$CH_2$)—, X is $OSO^-_3$; $R_3$ is H, $R_4$ is 2-hydroxypropyl; A is $SO_3$ and G is H or a cation including Na, K, or NH4.

3. A method as recited in claim 2 wherein said terpolymer is added to said aqueous medium in an amount of between about 0.1 to 500 ppm.

4. A method as recited in claim 2 wherein said terpolymer is added to said aqueous medium in an amount of between about 2 to 100 ppm.

5. A method as recited in claim 1 wherein said steam generating system is operating under a pressure of about 900 psig or greater.

6. A method as recited in claim 1 wherein said deposit formation comprises deposit forming species selected from Ca, Mg, Fe, and silica.

7. A method as recited in claim 1 wherein said aqueous medium comprises Fe, said method being effective to maintain said Fe dispersed in said aqueous medium during steam generation.

8. A method of controlling deposit formation in an aqueous medium of a steam generating system, said deposit formation being of the type resulting from the presence of Ca, Mg, Fe, or silica in said aqueous medium and said steam generating system being operated at pressure of 600 psig and greater, said method comprising adding to said aqueous medium a water soluble or water dispersible terpolymer of i) acrylic acid or soluble salt thereof; ii) allylalkoxylated ether or water soluble salt thereof; and iii) allylhydroxylated alkyl sulfonate ether or water soluble salt thereof, wherein ii) is allylethoxysulfate.

9. A method as recited in claim 8 wherein ii) is allylethoxy (10) sulfate.

10. A method as recited in claim 8 wherein iii) is allyl-2-hydroxypropyl sulfonate ether.

11. A method as recited in claim 8 wherein said steam generating system is operated at pressure of about 900 psig or greater.

12. A method as recited in claim 8 wherein said aqueous medium comprises Fe, said method being effective to maintain said Fe dispersed in said aqueous medium during steam generation.

13. A method as recited in claim 8 wherein said aqueous medium comprises Ca, Mg, and silica.

14. A method as recited in claim 1 wherein said pressure is between 600 and 1500 psig.

15. A method as recited in claim 1 wherein said pressure is between 600 and 900 psig.

16. A method as recited in claim 8 wherein said pressure is between 600 and 1500 psig.

17. A method as recited in claim 8 wherein said pressure is between 600 and 900 psig.

* * * * *

UNITED STATES PATENT AND TRADEMARK OFFICE
CERTIFICATE OF CORRECTION

PATENT NO. : 8,728,324 B2
APPLICATION NO. : 13/531871
DATED : May 20, 2014
INVENTOR(S) : Donald A. Meskers, Jr. et al.

Page 1 of 1

It is certified that error appears in the above-identified patent and that said Letters Patent is hereby corrected as shown below:

In the Claims:

In Claim 1, column 6, line 40, delete the word "with".
In Claim 1, column 6, line 43, delete the word "with".

Signed and Sealed this
Second Day of September, 2014

Michelle K. Lee
*Deputy Director of the United States Patent and Trademark Office*